United States Patent
Li et al.

(10) Patent No.: US 7,929,299 B2
(45) Date of Patent: Apr. 19, 2011

(54) SLIDING DOOR ASSEMBLY FOR ELECTRONIC DEVICE

(75) Inventors: Jing-Mao Li, Shenzhen (CN); Jin-Cai Shan, Shenzhen (CN); Hsuan-Tsung Chen, Taipei Hsien (TW); Guang-Yao Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 192 days.

(21) Appl. No.: 12/334,535

(22) Filed: Dec. 15, 2008

(65) Prior Publication Data

US 2009/0323290 A1 Dec. 31, 2009

(30) Foreign Application Priority Data

Jun. 25, 2008 (CN) .......................... 2008 1 0302310

(51) Int. Cl.
*G06F 1/16* (2006.01)
*H05K 5/00* (2006.01)
*H05K 7/00* (2006.01)

(52) U.S. Cl. ................................ 361/679.6; 361/679.02

(58) Field of Classification Search ............. 361/679.02, 361/679.37–679.39, 679.55, 679.58, 679.6
See application file for complete search history.

(56) References Cited

U.S. PATENT DOCUMENTS

| 2,258,948 | A | * | 10/1941 | Garrison | 312/110 |
| 5,026,130 | A | * | 6/1991 | Wright et al. | 312/323 |
| 6,415,622 | B2 | * | 7/2002 | Kim et al. | 62/409 |
| 7,139,167 | B2 | * | 11/2006 | Yang | 361/679.57 |
| 7,367,638 | B2 | * | 5/2008 | Marroquin et al. | 312/322 |
| 7,375,955 | B2 | * | 5/2008 | Xu | 361/679.55 |
| 7,384,093 | B2 | * | 6/2008 | Rasmussen | 296/156 |

* cited by examiner

*Primary Examiner* — Jayprakash N Gandhi
*Assistant Examiner* — Adrian S Wilson
(74) *Attorney, Agent, or Firm* — Zhigang Ma

(57) ABSTRACT

A sliding door assembly for an electronic device includes a carrier having a zone holding computerized connectors, a panel mounted to the bezel, a door slidably mounted between the bezel and the panel for selectively covering the zone, and two gears. One of the carrier and the panel comprises two racks. The gears are rotatably mounted to the door respectively and engage with the racks respectively.

20 Claims, 7 Drawing Sheets

SLIDING DOOR ASSEMBLY FOR ELECTRONIC DEVICE

BACKGROUND

1. Technical Field

The disclosure relates to sliding door assemblies, and more particularly to a sliding door assembly for an electronic device.

2. Description of Related Art

An electronic device, such as a computer, includes a lot of accesses to certain components such as disk drives, tape drives, floppy drives, etc. However, dust or other debris may enter through the accesses and possibly damage components.

DETAILED DESCRIPTION

Figure 1:
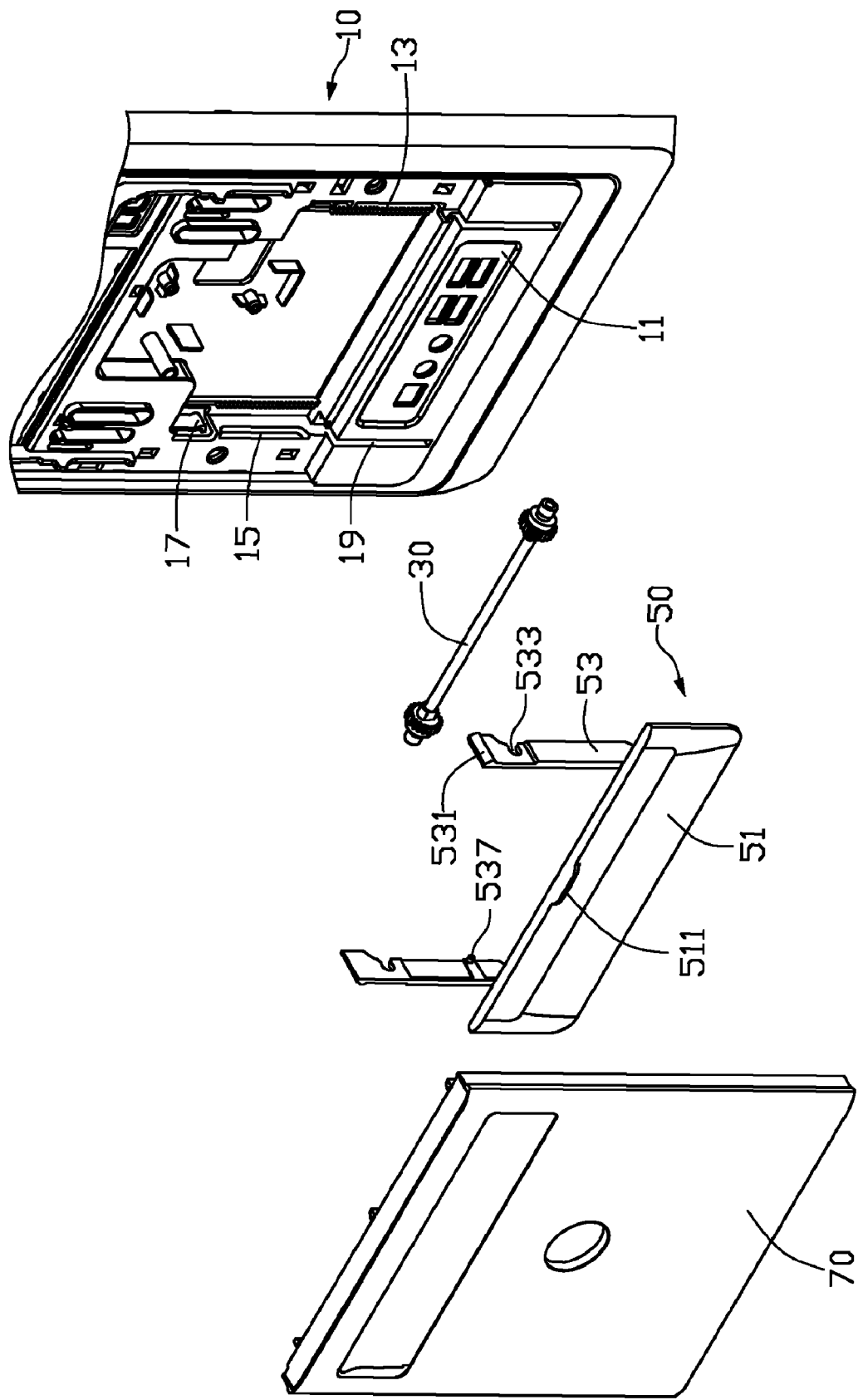
FIG. 1 is an exploded, isometric view of an exemplary embodiment of a sliding door assembly, the sliding door assembly including a carrier, a gear device, a door, and a panel.
Figure 2:
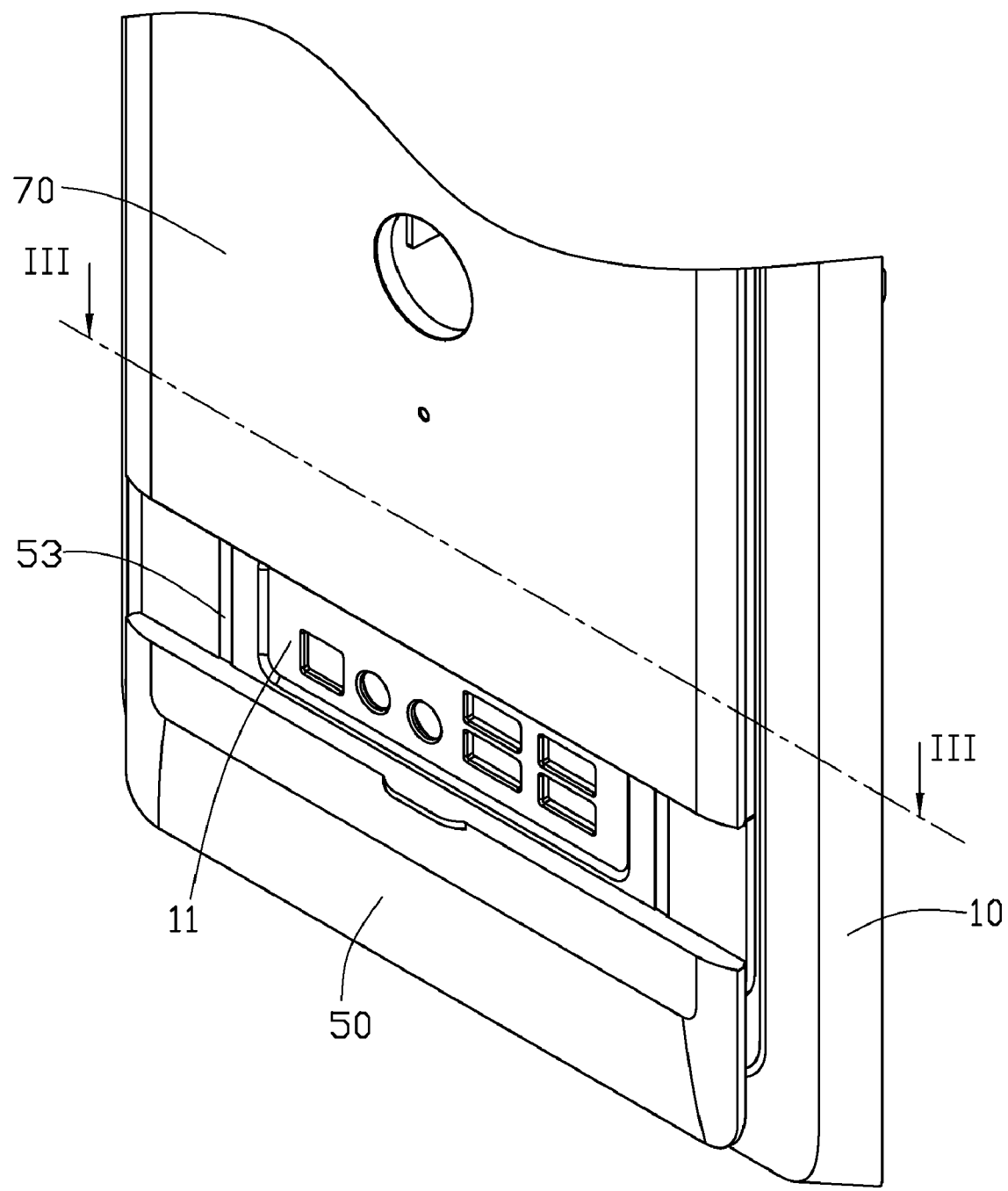
FIG. 2 is an assembled view of FIG. 1.
Figure 3:
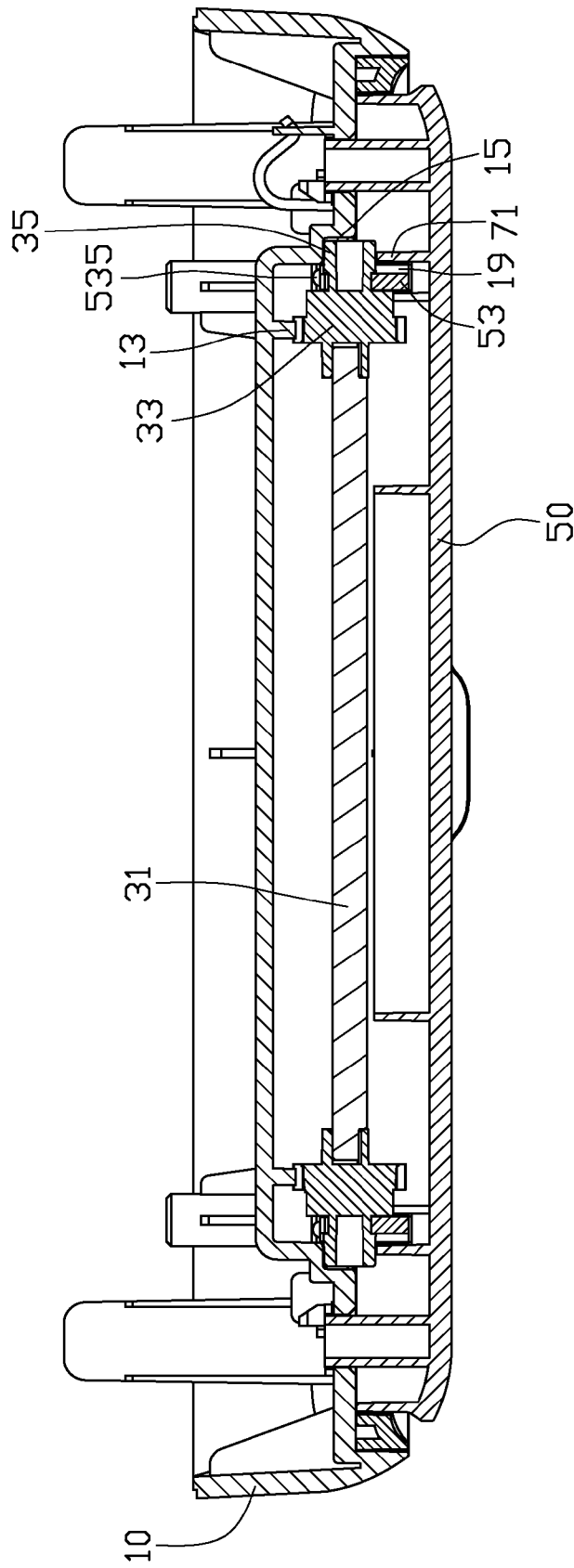
FIG. 3 is a cross-sectional view along the line III-III of FIG. 2 comprising a panel.

Referring to FIG. 1, an exemplary embodiment of a sliding door assembly for an electronic device includes a carrier 10, a gear device 30, a door 50, and a panel 70. The sliding door assembly may be used to prevent dust and other debris from entering an access zone of the electronic device.

Figure 4:
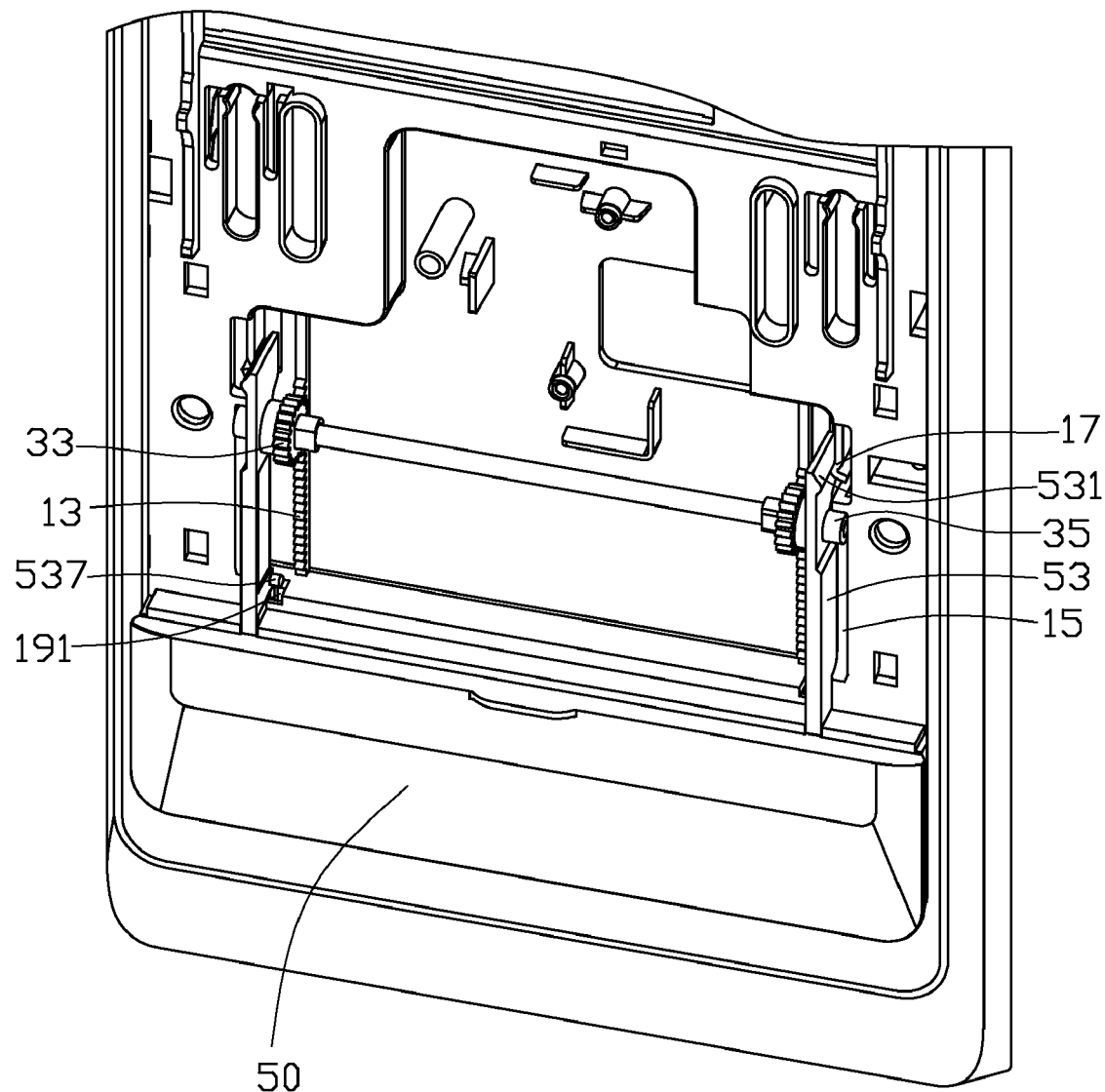
FIG. 4 is similar to FIG. 2, but omitting the panel.
Figure 7:
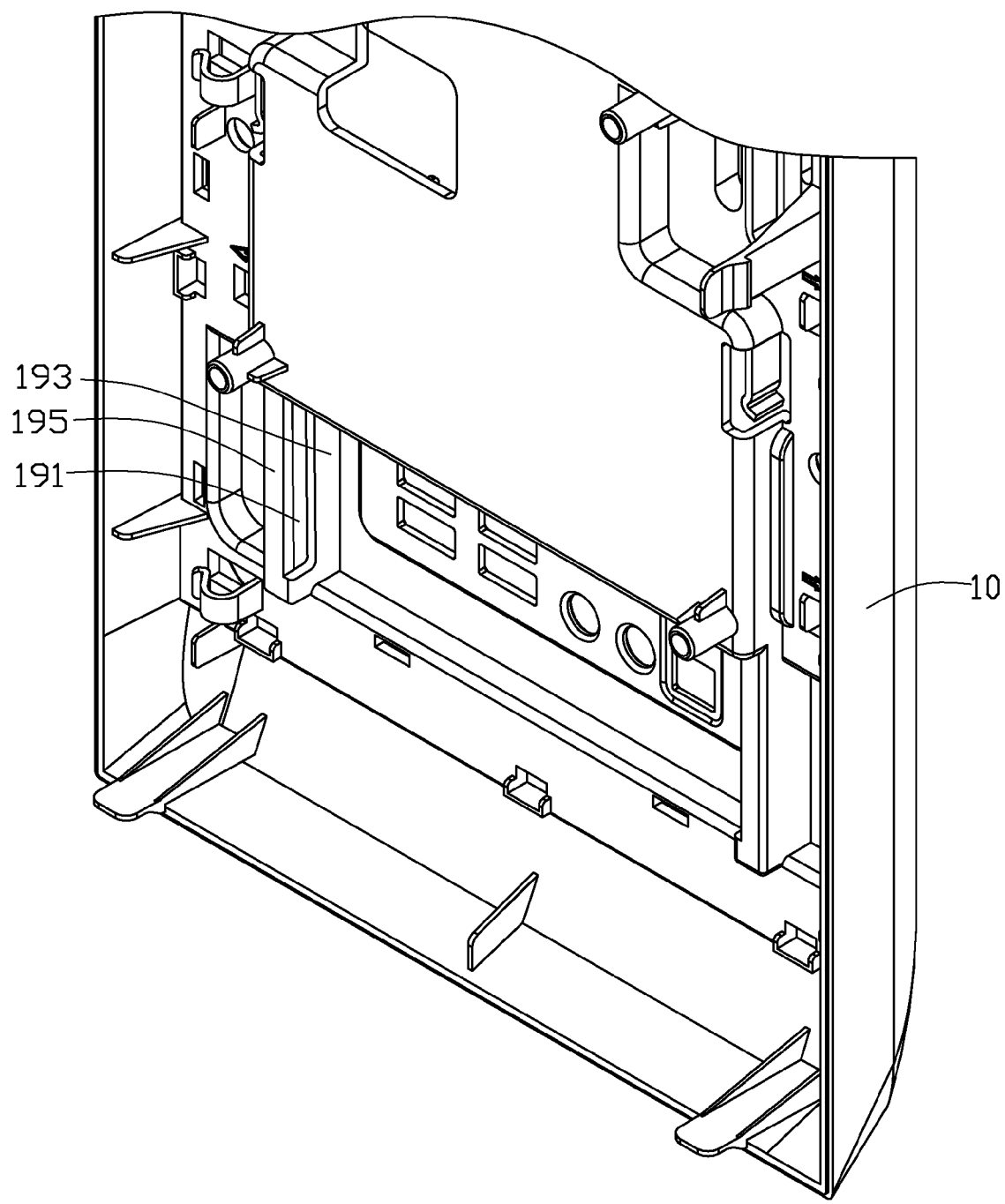
FIG. 7 a reverse view of the carrier in FIG. 1.

Referring to FIGS. 1 and 4, in one embodiment, the electronic device is a computer, and the carrier 10 is a front bezel of the computer. The carrier 10 includes an access zone 11, such as a zone that defines a plurality of through holes for mounting a plurality of connectors (not shown), such as universal serial bus (USB) connectors, and PS/2 connectors, and two racks 13 set along a vertical direction and above opposite ends of the zone 11. Two sliding grooves 19 are defined in the carrier 10 at the opposite ends of the zone 11 along the vertical direction. Each sliding groove 19 is bounded by a first sidewall 193 (see FIG. 7) adjacent to the zone 11, a second sidewall (not labeled) opposite to the first sidewall 193, and a bottom wall 195 (see FIG. 7) connecting the first sidewall 193 to the second sidewall. A slot 191 (see FIG. 7) is defined in the first sidewall 193 adjacent to the bottom wall 195 and communicating with the sliding groove 19. Two guiding grooves 15, each adjacent to one of the racks 13, are defined in the carrier 10. Two elastic hooks 17, each over a corresponding one of the guiding grooves 15, extend from the carrier 10.

Figure 6:
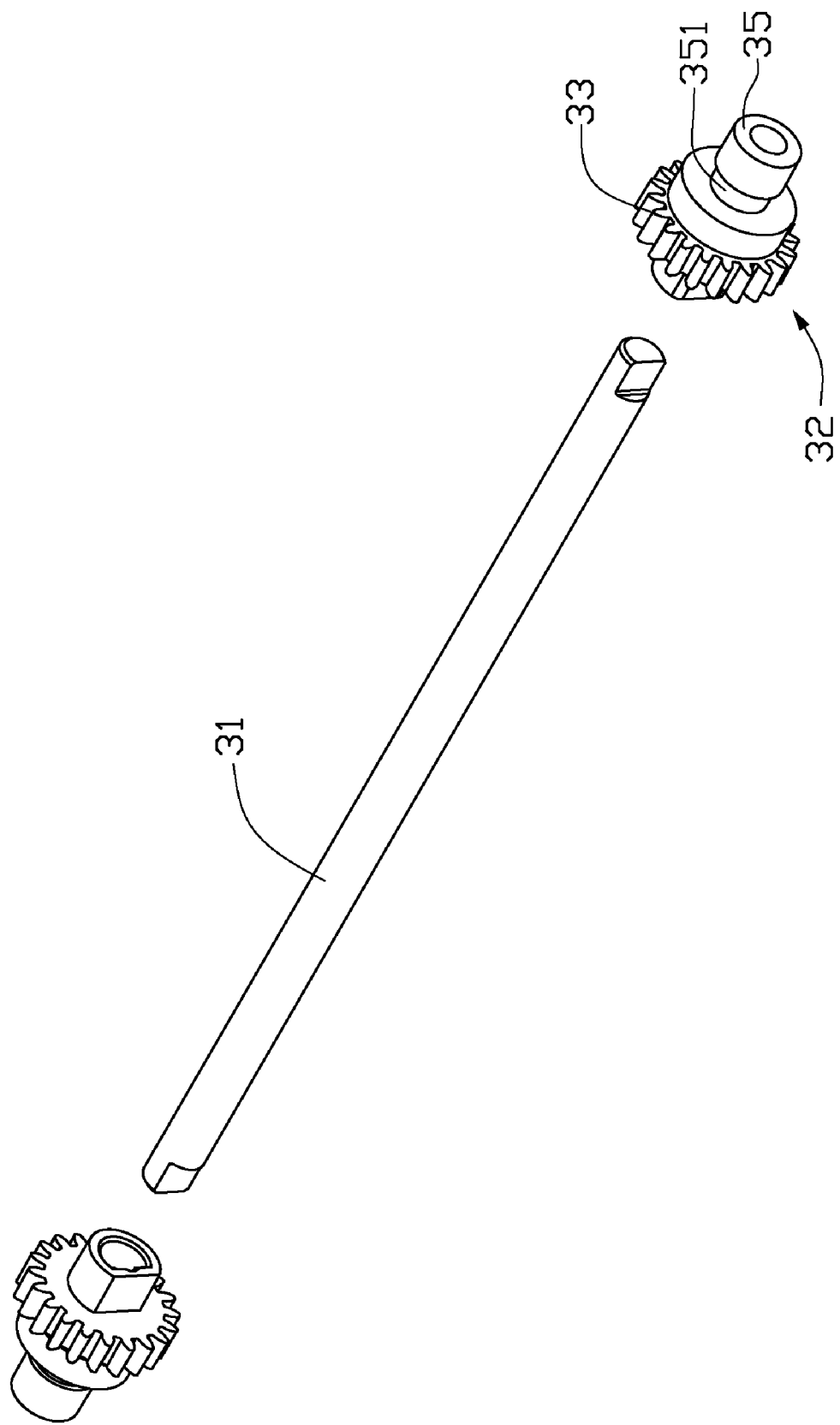
FIG. 6 is an exploded, isometric view of the gear device in FIG. 1.

Referring to FIG. 6, the gear device 30 includes a shaft 31, and two gears 32 mounted to opposite ends of the shaft 31. Each gear 32 includes a toothed portion 33, and a roller 35 extending from a center of a side of the toothed portion 33. A ring groove 351 is defined in a circumference of the roller 35.

Figure 5:
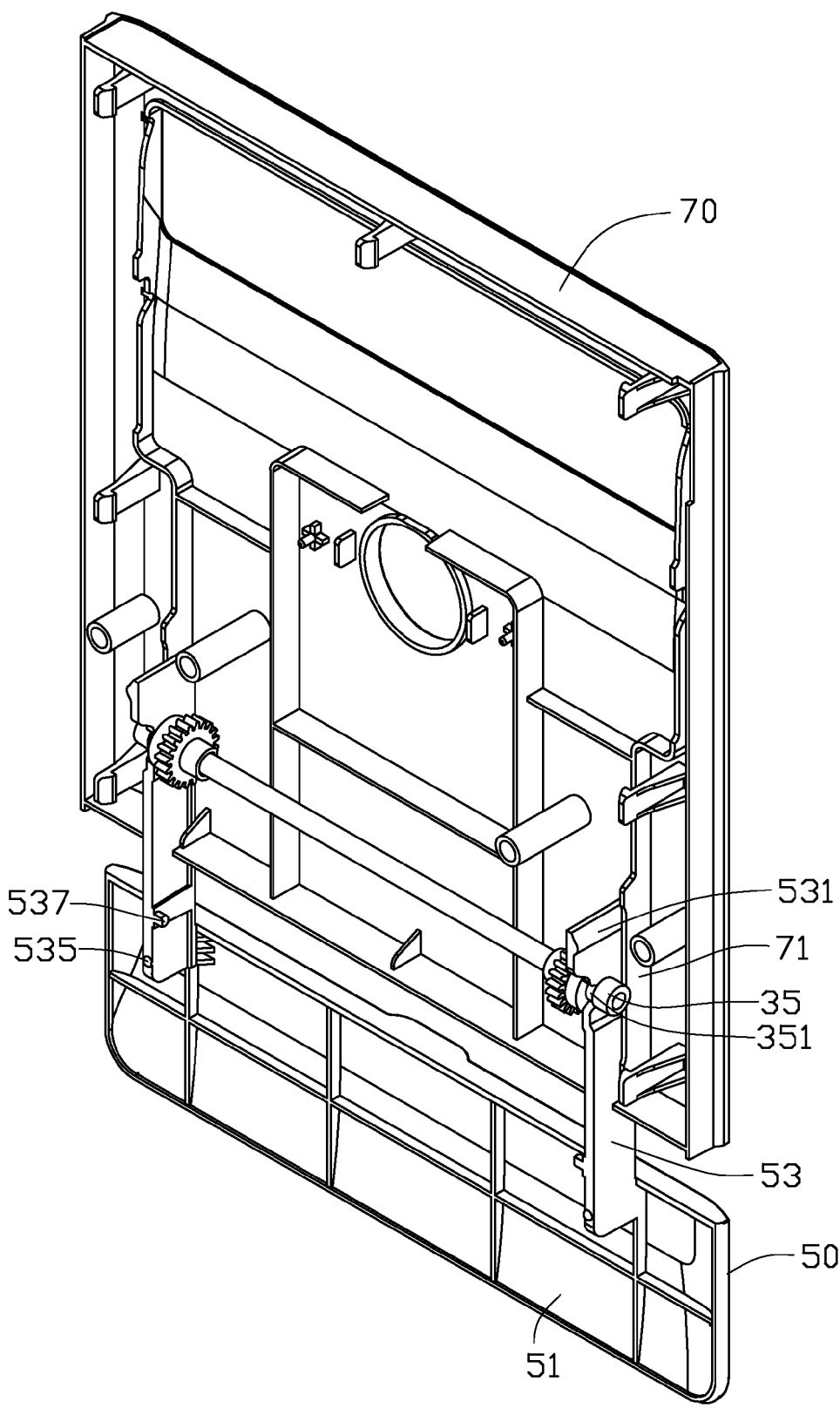
FIG. 5 is a reverse view of the sliding door assembly of FIG. 2, with the carrier being omitted.

Referring to FIGS. 1 and 5, the door 50 includes a cover 51, and two arms 53 extending upward from an inner face of the cover 51. A handle 511 extends from an outer face of the cover 51, and includes a distal end opposite to the cover 51. A catching projection 531 extends from the distal end of each arm 53, away from the other arm 53. A C-shaped pivot groove 533 is defined in an inner side of each arm 53 under the corresponding catching projection 531. A pole 537 extends from each arm 53 toward the other arm 53. A rise point 535 (see FIG. 5) extends from the inner side of each arm 53.

Two guiding bars 71 (see FIG. 5) extend from an inner face of the panel 70 along the vertical direction, corresponding to the guiding grooves 15 of the carrier 10.

Referring to FIGS. 1 to 7, in assembly, a portion having the ring groove 351 of each roller 35 is rotatably snapped into one of the pivot grooves 533 of the door 50. The arms 53 of the door 50 are slidably received in the sliding grooves 19 of the carrier 10 respectively, while the rise points 535 of the two arms 53 abut against the corresponding bottom walls 195. The toothed portions 33 of the gear device 30 engage with the racks 13 respectively. The rollers 35 of the gear device 30 are rotatably received in the corresponding guiding grooves 15. The panel 70 is mounted to the carrier 10 over the zone 11. The arms 53 are sandwiched between the carrier 10 and the panel 53. Each roller 35 is sandwiched between a corresponding portion of the carrier 10 bounding the corresponding guiding groove 15 and the corresponding sliding bar 71 (see FIG. 3).

In use, the handle 511 is operated to slide the door 50 up and down. When the door 50 is slid to a highest position, the cover 51 completely covers the zone 11. In the highest position, the catching projections 531 of the door 50 are caught by the corresponding elastic hooks 17 to make the door stand still, so as to prevent the door 50 from falling down when the door 50 is closed. The door 50 is moved down a distance to drive the catching projections 531 to disengage from the elastic hooks 17, and then the door 50 can slide down the rest of the way under gravity to expose the zone 11. Wherein, when the door 50 slides down from the highest position, the poles 537 of the door 50 will enter into and slide in the corresponding slots 191, thereby restricting the arms 53 to be received in the corresponding sliding grooves 19, so as to prevent the door 50 from being accidentally disengaged from the carrier 10.

In the present disclosure, appropriate damping force is obtained via the engagement between the toothed portions 33 and the racks 13, the engagement between the rollers 35 and the portions bounding the guiding grooves 15, the engagement between the rollers 35 and the guiding bars 71, and the engagement between the rise points 535 and the bottom walls 195, to make the sliding action of the door 50 smooth and slow thereby decreasing noise.

In one embodiment, the gears 32 can be damping gears. A damping gear is a kind of gear that the damping force generating from which will increase with increasing of a rotate speed of the gear.

In other embodiments, the fit clearance between the rollers 35 and the portions bounding the guiding grooves 15, and the fit clearance between the rollers 35 and the guiding bars 71 may be adjusted, and the materials of the gears 32, the racks 13, the portions bonding the guiding grooves 15, the guiding bars 71 etc., can be changed to allow enough friction that rather than the door 50 being able to fall under gravity it can remain in place wherever it is left in its slide path by a user.

In other embodiments, the racks 13 may be removed from the carrier 10 and mounted to the panel 70. The guiding grooves 15 and the guiding bars 71 may be interchanged with each other.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sliding door assembly for an electronic device, comprising:
   a carrier comprising a zone for holding computerized components;
   a gear device comprising two gears separated from each other by a fixed distance, wherein each of the gears comprises a toothed portion having a plurality of teeth, and a roller extending from the toothed portion;
   a door capable of selectively covering the zone; and
   a panel mounted to the carrier;
   wherein a selected one of the carrier or the panel comprises two racks;
   wherein a selected one of the carrier or the panel defines two guiding grooves;
   wherein the toothed portions engage with the racks respectively so as to allow the gears to rotatably mount to the door, wherein the rollers are received by and capable of rolling in the guiding grooves respectively, and wherein each of the rollers is sandwiched between a portion bounding the corresponding guiding groove and the panel.

2. The sliding door assembly of claim 1, wherein the door comprises two arms, a catching projection extends from each of the arms, the carrier comprising two elastic hooks capable of catching the catching projections respectively to make the door stand still when the door is closed.

3. The sliding door assembly of claim 2, wherein two sliding grooves are defined in the carrier, the arms are slidably received in the sliding grooves respectively.

4. The sliding door assembly of claim 3, wherein a rise point extends from each of the arms, each rise point abuts against a portion bounding the corresponding sliding groove.

5. The sliding door assembly of claim 3, wherein a slot is defined in a portion bounding each sliding groove, a pole extends from each of the arms, and the poles are able to slide in the corresponding slots.

6. The sliding door assembly of claim 2, wherein the gear device further comprises a shaft, the gears are mounted to opposite ends of the shaft.

7. The sliding door assembly of claim 6, wherein a ring groove is defined in each of the rollers, a pivot groove is defined in each of the arms, a portion defining the ring groove of each of the rollers is rotatably snapped in the corresponding pivot groove.

8. The sliding door assembly of claim 1, wherein the other one of the carrier and the panel comprises two guiding bars corresponding to the guiding grooves; each of the rollers is sandwiched between the portion bounding the corresponding guiding groove and the guiding bar.

9. The sliding door assembly of claim 1, wherein each of the gears is a damping gear.

10. A sliding door assembly for an electronic device, comprising:
    a carrier comprising a zone for holding computerized components, two sliding grooves being defined in and on opposite ends of the carrier;
    a gear device comprising two gears separated from each other by a fixed distance;
    a door comprising a cover capable of selectively covering the zone, and two arms extending from the cover; and
    a panel mounted to the carrier;
    wherein the carrier or the panel comprises two racks;
    wherein the gears are rotatably mounted to the arms respectively and engage with the racks respectively, and the arms are slidably received in the sliding grooves and sandwiched between the carrier and the panel.

11. The sliding door assembly of claim 10, wherein a catching projection extends from each of the arms, the carrier comprising two elastic hooks capable of catching the catching projections respectively to make the door stand still when the door is closed.

12. The sliding door assembly of claim 10, wherein a rise point extends from each of the arms, each rise point abuts against a portion bounding the corresponding sidling groove.

13. The sliding door assembly of claim 10, wherein a roller extends from a center of a side of each of the gears, one of the carrier and the panel defines two guiding grooves, the rollers are received in and capable of rolling in the guiding grooves respectively.

14. The sliding door assembly of claim 13, wherein the other one of the carrier and the panel comprises two guiding bars corresponding to the guiding grooves; each of the rollers is sandwiched between a portion bounding the corresponding guiding groove and the corresponding guiding bar.

15. The sliding door assembly of claim 13, wherein a ring groove is defined in each of the rollers, a pivot groove is defined in each of the arms, a portion defining the ring groove of each of the rollers is rotatably snapped in the corresponding pivot groove.

16. The sliding door assembly of claim 15, wherein the gear device further comprises a shaft, the gears are mounted to opposite ends of the shaft.

17. The sliding door assembly of claim 10, wherein a slot is defined in the portion bounding each of the sliding grooves, a pole extends from each of the arms, and the pole is able to slide in the corresponding slot.

18. The sliding door assembly of claim 10, wherein each of the gears is a damping gear.

19. An electronic device comprising:
    a bezel comprising an access zone defining a plurality of through holes for mounting a plurality of connectors, and two guiding grooves defined adjacent to the zone;
    a panel mounted to the bezel;
    a door slidably mounted between the bezel and the panel, capable of being positioned between a first position for covering the zone and a second position for exposing the zone; and
    two gears separated from each other by a fixed distance, each of the gears comprising a roller extending therefrom;
    wherein the bezel or the panel comprises two racks;
    wherein the gears are rotatably mounted to the door respectively and engage with the racks respectively with the rollers rolling in the guiding grooves.

20. The electronic device of claim 19, wherein two catching projections extend from the door, the bezel comprising two elastic hooks capable of catching the catching projections respectively to make the door stand still when the door is closed.

* * * * *